US008982763B2

(12) United States Patent
Ofir et al.

(10) Patent No.: US 8,982,763 B2
(45) Date of Patent: Mar. 17, 2015

(54) METHOD AND DEVICE FOR MANEUVERING TALK GROUPS TO A NEW CHANNEL

(71) Applicant: Motorola Solutions, Inc., Schaumburg (IL)

(72) Inventors: Gabi Ofir, Reshon Letzion (IL); Aharon Elmaleh, Makabim-Re'Ut (IL); Dmitry Kliteynik, Kiryat Gat (IL)

(*) Notice: Subject to any disclaimer, the term of this patent is extended or adjusted under 35 U.S.C. 154(b) by 114 days.

(21) Appl. No.: 13/770,211

(22) Filed: Feb. 19, 2013

(65) Prior Publication Data

US 2014/0233447 A1    Aug. 21, 2014

(51) Int. Cl.
| | |
|---|---|
| H04W 4/00 | (2009.01) |
| H04W 4/10 | (2009.01) |
| H04W 36/16 | (2009.01) |
| H04W 4/08 | (2009.01) |
| H04W 36/00 | (2009.01) |

(52) U.S. Cl.
CPC ........ *H04W 4/08* (2013.01); *H04W 4/10* (2013.01); *H04W 36/0016* (2013.01)
USPC .......................................................... 370/312

(58) Field of Classification Search
CPC ............... H04M 2203/2044; H04M 2207/18; H04M 3/42; H04W 4/10; H04W 76/005; H04W 76/02

USPC ................ 370/254–350; 709/201–213
See application file for complete search history.

(56) References Cited

U.S. PATENT DOCUMENTS

| | | | |
|---|---|---|---|
| 8,300,790 B2 | 10/2012 | Buford et al. | |
| 2004/0120474 A1* | 6/2004 | Lopponen et al. | 379/88.17 |
| 2010/0119083 A1* | 5/2010 | Logalbo et al. | 381/111 |
| 2010/0159824 A1* | 6/2010 | Goodjohn | 455/11.1 |
| 2011/0255521 A1* | 10/2011 | Bohn et al. | 370/337 |
| 2012/0163241 A1 | 6/2012 | Sall | |

* cited by examiner

*Primary Examiner* — Ayaz Sheikh
*Assistant Examiner* — Debebe Asefa
(74) *Attorney, Agent, or Firm* — Daniel R. Bestor

(57) ABSTRACT

A process for communicating with a plurality of push-to-talk (PTT) devices in a wireless network of PTT devices includes, at a first one of the PTT devices, responsive to detecting a change in selected channel, via a channel selector input, from the first channel to a second channel while a PTT input is activated: transmitting, to other PTT devices in a first talkgroup on the first channel, a notification that further transmissions by the PTT device will be made in the second channel, switching the transmitter from the first channel to the second channel, and transmitting further communications to the one or more other PTT devices in a second talkgroup on the second channel.

20 Claims, 5 Drawing Sheets

METHOD AND DEVICE FOR MANEUVERING TALK GROUPS TO A NEW CHANNEL

TECHNICAL FIELD

The present application relates to push-to-talk handsets. In particular, the application relates to a PTT device having a channel selector and a PTT input, and a method and device for maneuvering a talk group to a new channel.

BACKGROUND

Wireless communication systems provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, repeater, and/or access point. Such a system typically includes a system infrastructure which generally includes a network of various fixed terminals, which are in direct radio communication with the subscriber units. Each of the base stations operating in the system may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the system are made via respective serving fixed terminals. Sites of neighboring fixed terminals in a wireless communication system may be offset from one another or may be non-overlapping or partially or fully overlapping. In another example, subscriber units may operate in a direct mode (e.g., without having to pass through, and without the aid of, other infrastructure devices such as a repeater or base station).

Wireless communication systems may operate according to an industry standard protocol such as, for example, the Project 25 (P25) standard defined by the Association of Public Safety Communications Officials International (APCO), or other radio protocols, such as the TETRA standard defined by the European Telecommunication Standards Institute (ETSI), the Digital Private Mobile Radio (dPMR) standard also defined by the ETSI, the Digital Mobile Radio (DMR) standard also defined by the ETSI, an open media alliance (OMA) push to talk (PTT) over cellular (OMA-PoC) standard, a voice over IP (VoIP) standard, or a PTT over IP (PoIP) standard. Protocols such as PoC, VoIP, and PoIP are implemented over broadband RANs including third generation and fourth generation networks such as third generation partnership project (3GPP) Long Term Evolution (LTE) networks.

Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in wireless communication systems such as those set forth above send user communicated speech and data, herein referred to collectively as 'traffic information', in accordance with the designated protocol.

Many so-called "public safety" wireless communication systems provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

Subscriber units such as push-to-talk (PTT) handsets in particular have been used for some time by emergency personnel but also have recently begun to grow in general popularity. PTT handsets contain a PTT input that enables the user to communicate with a group of users on the same channel (e.g., a particular physical or logical channel statically or dynamically assigned to a particular talkgroup, or set of associated PTT devices). The communications between the PTT handsets occur at one of a set of isolated frequencies that may be selected, at least in part, by a knob on the PTT handsets. To communicate with users on other physical or logical channels, the user manually switches the channel at the PTT handset thereby causing the transmission and reception channel to change (perhaps in conjunction with a frequency assignment by a trunked repeater).

In some situations, a particular user at a particular PTT handset may wish to move all or some of the PTT devices subscribed to a currently active talkgroup to another channel. For example, a particular user may determine that a current channel being used by the talkgroup has become too crowded or interference prone, and that further communications to the entire group of PTT devices should be moved to a new channel. In another example, the particular user may wish to have further discussions with only a subset of the PTT devices in the talkgroup, and wishes to move only a portion of the PTT devices to the new channel for further discussion, such as when the talkgroup is a police force talkgroup, and the particular user wishes to move all traffic officers to a new channel temporarily for discussions specific to the traffic officers.

Conventionally, the particular user would key-up his PTT device (by activating the PTT input such as pressing a PTT button), and announce to the group that all (or only some) PTT device users should manually change their channel to the new channel. PTT device users wishing to join the new channel would then manually operate a channel selection input (such as a channel knob) on their PTT device to move to the new channel. However, relying on voice instructions from the channel change initiating user to move to a new channel, and correct manual selection of that new channel by every other PTT device user in the talkgroup, is prone to errors and increases an amount of time required to move some or all of the desired members of the talkgroup to the new channel.

Accordingly, an improved system and method is needed for automatically maneuvering some or all members of a currently active talkgroup to a new channel, in a more automated, time efficient, and error-free manner.

BRIEF DESCRIPTION OF THE DRAWINGS

Embodiments will now be described by way of example with reference to the accompanying drawings, in which.

DETAILED DESCRIPTION

In light of the foregoing, it would be advantageous to provide for a method and device that maneuvers some or all members of a currently active talkgroup to a new channel, in a more automated, time efficient, and error-free manner, responsive to a detected switching of a channel selector input at an initiating PTT device while a PTT input at the initiating PTT device is activated (e.g., a PTT button is depressed).

In one embodiment a push-to-talk (PTT) device includes a transmitter, a receiver, a channel selector input that selects a first channel on which to transmit communications with respect to a first talkgroup, a PTT input that activates transmission of a PTT signal from the device to a particular talkgroup, as a function of the channel selector, when activated, and a processor configured to, responsive to detecting a change in selected channel, via the channel selector input, from the first channel to a second channel while the PTT input is activated: transmit, to one or more other PTT devices in the first talkgroup on the first channel via the transmitter, a notification that further transmissions by the PTT device will be made in the second channel, switch the transmitter from the first channel to the second channel, and transmit communications to the one or more other PTT devices on the second channel via the transmitter.

In another embodiment a process for communicating with a plurality of push-to-talk (PTT) devices in a wireless network of PTT devices includes, at a first one of the PTT devices, responsive to detecting a change in selected channel, via a channel selector input, from the first channel to a second channel while a PTT input is activated: transmitting, to other PTT devices in a first talkgroup on the first channel, a notification that further transmissions by the PTT device will be made in the second channel, switching the transmitter from the first channel to the second channel, and transmitting further communications to the one or more other PTT devices in a second talkgroup on the second channel.

Each of the above-mentioned embodiments will be discussed in more detail below, starting with example network and device architectures of the system in which the embodiments may be practiced, followed by a discussion of maneuvering talkgroups from the point of an initiating PTT device and then from the point of view of a talkgroup receiving PTT device. Further advantages and features consistent with this disclosure will be set forth in the following detailed description, with reference to the figures.

I. Network and Device Architectures

Figure 1:
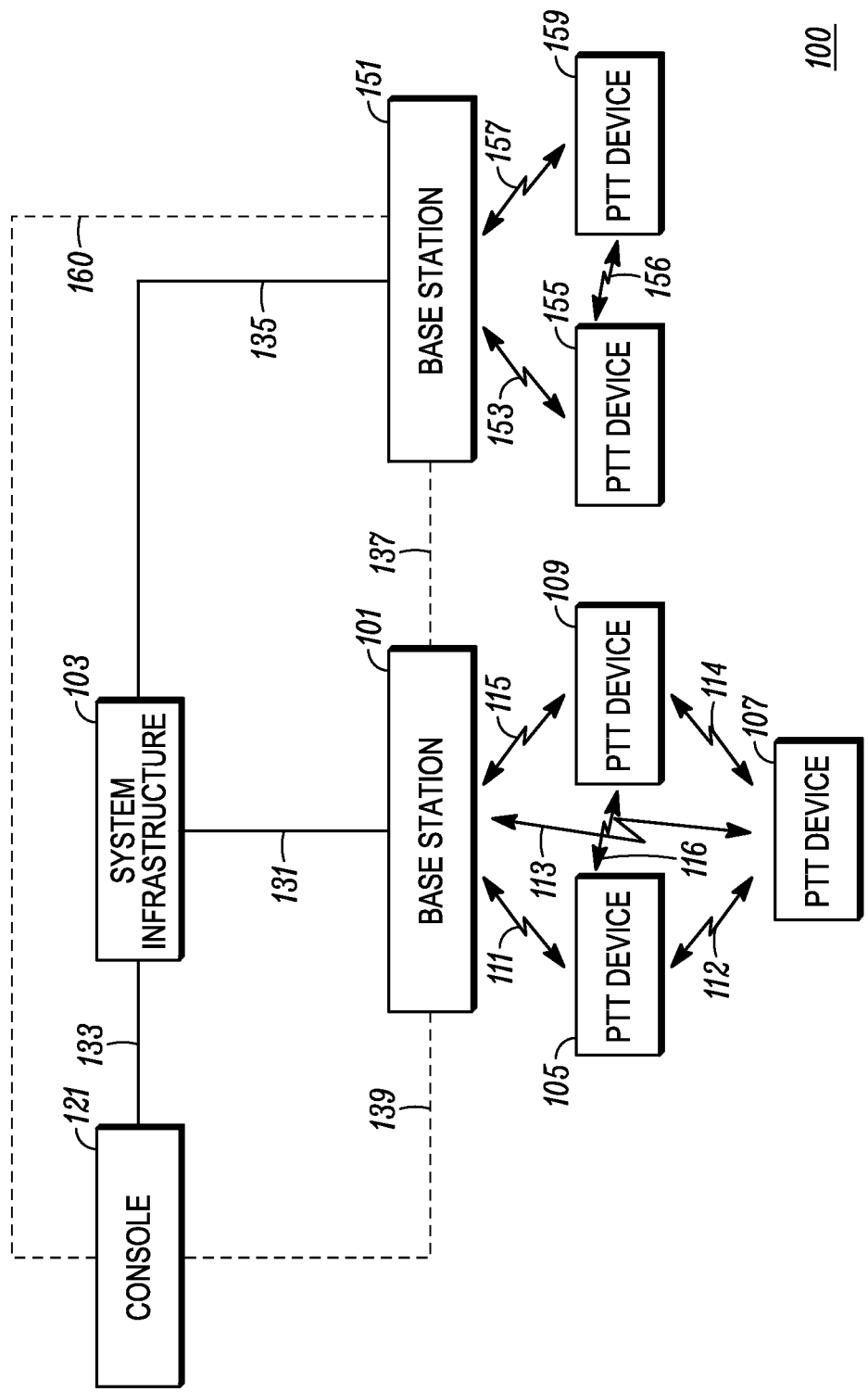
FIG. 1 is a schematic diagram of a wireless communication system in accordance with an embodiment.

FIG. 1 shows a wireless communication system 100 which may be adapted in accordance with an embodiment of this disclosure. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, the TETRA standard, the OMA-PoC standard, or the PoIP standard, among other possibilities.

The system 100 shown in FIG. 1 includes one or more fixed terminals (e.g., base stations/repeaters/control terminals) (BSs) 101, 151, which may be operably connected to a system infrastructure 103 via respective wired or wireless links 131, 135. While the term BS will be used to refer to the fixed terminal 101, for ease of reference, it should be noted that the fixed terminal 101 may, in some embodiments, be a repeater or some other type of fixed terminal. The BS 101 has radio links with a plurality of subscriber units, particularly PTT devices in a service cell or site at least partially defined by a geographic location of the BS 101. In addition to PTT devices, BS 101 may maintain a direct wireless or wired link 139 (or indirect via system infrastructure 103) with a dispatch console 121 or other operator. The dispatch console 121 may be configured to act as a communications client of BS 101. Three PTT devices 105, 107, 109 are illustrated in FIG. 1 as being within the service area of, and being registered with, BS 101 via respective radio links 111, 113, 115. In one embodiment, the BS 101 serves PTT devices including the PTT devices 105, 107, 109 with radio communications to and from other terminals, including (i) PTT devices served by the BS 101, (ii) PTT devices served by other BSs such as BS 151, (iii) other terminals including PTT devices in other systems (not shown) operably linked to the system 100 via the system infrastructure 103, and (iv) the console 121. In another embodiment, PTT devices 105, 107, 109 may instead operate in a direct communication mode (DCM) via example radio links 112, 114, 116, in which DCM PTT devices 105, 107, 109 transmit communications amongst one another without the aid of an infrastructure device.

BS 151 similarly has radio links with a plurality of PTT devices, particularly PTT devices in a service cell or site at least partially defined by a geographic location of the BS 151. In addition to PTT devices, BS 151 may maintain a direct wireless or wired link 160 (or indirect via system infrastructure 103) with the dispatch console 121 or other operator. The dispatch console 121 may be configured to act as a communications client of BS 151. Two PTT devices 155, 159 are illustrated in FIG. 1 as being within the service area of, and being registered with, BS 151 via respective radio links 153, 157. The BS 151 thereby serves PTT devices including the PTT devices 155, 159 with radio communications to and from other terminals, including (i) PTT devices served by the BS 151, (ii) PTT devices served by other BSs such as BS 101, (iii) other terminals including PTT devices in other systems (not shown) operably linked to the system 100 via the system infrastructure 103, and (iv) the console 121. In another embodiment, PTT devices 155, 159 may similarly operate in a DCM, via example radio link 156 in which DCM PTT devices 155, 159 transmit communications amongst one another without the aid of an infrastructure device.

The system infrastructure 103 includes known sub-systems (not shown) required for operation of the system 100. Such sub-systems may include, for example, sub-systems providing authentication, routing, PTT device registration and location, system management, and other operational functions within the system 100. The system infrastructure 103 may additionally provide routes to other BSs (not shown) providing cells serving other PTT devices, and/or may provide access to other types of networks such as a plain old telephone system (POTS) network or a data-switched network such as the Internet. The system infrastructure 103 may also maintain a separate link 133 to the console 121 for supporting voice calls to and from the console 121.

Each of the BSs 101, 151 may operate as a conventional radio site, a trunked radio site, or a broadband radio site. In a conventional radio system, a plurality of PTT devices are formed into groups. Each group uses an associated channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. Thus, for example, wireless links 111, 113, and 115 may correspond to a statically assigned single channel (carrying traffic and signaling) made up of a pair of frequencies, including an uplink frequency to handle traffic originating from a PTT device, and a downlink frequency to handle traffic being repeated to other PTT devices in the talkgroup (and thus tuned to the downlink frequency of the pair of frequencies).

In a trunked radio system, PTT devices use a pool of channels for supporting virtually an unlimited number of talkgroups. Thus, all talkgroups are served by all channels. For example, in a trunking system, all PTT devices operating at a radio site idle on a designated control channel or rest channel and when a new call is requested over the control or rest channel, is assigned a new traffic channel (separated from the control channel by frequency or time slot) for the new group call while remaining PTTs not participating in the new group call stay on the designated control channel or rest channel. Thus, for example, wireless links 111, 113, and 115 may correspond to a dynamically assigned traffic channel made up of a pair of frequencies, including an uplink frequency to handle traffic originating from a PTT device, and a downlink frequency to handle traffic being repeated for other PTT devices in the talkgroup (and thus tuned to the downlink frequency of the pair of frequencies). An additional pair of frequencies may be assigned to BS 101 to act as the control or rest channel, to which PTT devices 105, 107, 109 would return once a call has ended and traffic has ceased on the assigned traffic channel.

In a broadband radio system, PTT devices are each assigned their own separate (IP-based) broadband link, and talkgroups and channels are assigned logically and tracked and managed by the system infrastructure 103. Thus, for example, wireless links 111, 113, and 115 may correspond to separate individually assigned traffic channels, each made up of a pair of frequencies, including an uplink frequency to handle traffic originating from a PTT device, and a downlink frequency to handle traffic being separately repeated for each other PTT device s in the talkgroup. Routing between PTT device s is handled logically and on an IP-basis by the infrastructure 103, such that communications transmitted by an initiating PTT device 105 and labeled with the target talkgroup is duplicated within the system infrastructure 103 and separately sent to target PTT devices 107 and 109 via separate broadband downlinks in wireless links 113 and 115. In the context of the broadband radio system, the frequencies of each separate broadband link 111, 113, 115 are independent of logical channels created over each separate broadband link, and broadband traffic across each link is tagged with a logical identifier that identifies particular broadband traffic as associated with a particular talkgroup. Thus, in this context, a talkgroup identifier and a logical channel identifier may be one in the same and may perform same or similar purposes. In other embodiments, broadband Multicast-Broadcast Single Frequency Network (MBSFN) channels may be used for the first and second channels, such that the channel change is a physical channel change rather than a logical channel change, with all requested subscribers of the first talkgroup moving from the first MBSFN physical channel to the second MBSFN physical channel. Other possibilities exist as well.

In a direct mode radio system, BSs 101, 151, system infrastructure 103, and console 121 (and corresponding links) would not exist. Direct mode is a communication technique where any PTT device can communicate with one or more other PTT devices without the need for any additional infrastructure equipment (including base stations or repeaters). Direct mode operation can therefore provide a more efficient, less costly communication system than repeater mode operation. Thus, for example, a direct mode radio system may be comprised solely of DCM PTT device s 105, 107, 109 and intervening wireless direct links 112, 114, and 116. A separate DCM network of DCM PTT devices 155, 159 may be created via intervening wireless direct link 156.

Figure 2:
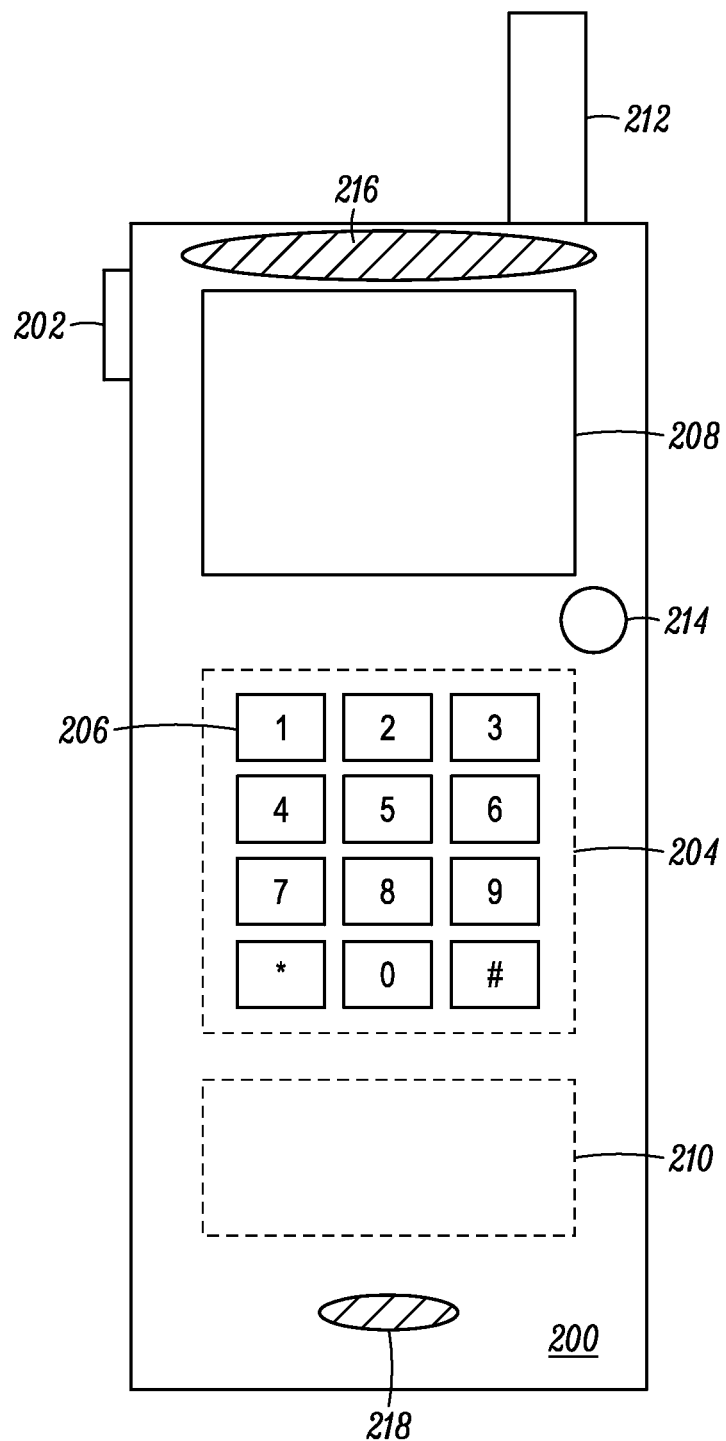
FIG. 2 is a block diagram of an illustrative external layout of a PTT device in accordance with an embodiment.

FIG. 2 is an example functional external block diagram of a PTT device 200 such as PTT device 105 operating within the system 100 of FIG. 1 in accordance with some embodiments. Other PTT devices such as PTT devices 107, 109, 155, and/or 157 may contain same or similar external structures. The PTT device 200 includes a PTT input 202, an alphanumeric keypad 204 containing keys 206, an antenna 212, a channel selector 214, a display 208 and/or a touch panel 210, a speaker 216, and a microphone 218. The PTT input 202 may be a PTT button that permits the handset 200 to transmit a PTT signal and subsequent voice audio or other data when manually depressed and receive voice audio or other data when not depressed. Other types of PTT input mechanisms could be used as well, such as a switch, a capacitive or resistive touch element, or other type of input element. For example, a capacitive touch element could be activated and remain activated when it senses a user's finger close to or on a surface of the touch element, and may similarly permit the handset 200 to transmit a PTT signal and subsequent voice audio or other data when activated (finger present) and receive voice audio or other data when not activated (finger not present).

The display 208 displays information such as talkgroup identification, subgroup identification, transmission and reception frequencies, time/date, remaining power, incoming and dialed phone numbers, or information from the internet, among other possibilities. The display 208 can be formed using LCD, OLED, or some other technology and may be color or monochrome. The touch panel 210 has sensors to detect contact by a finger or stylus. Placement of the various elements in the handset 200 as shown in the figures is merely exemplary. Similarly, although one handset layout is shown, different handset layouts may alternatively be used.

The keypad 204 can contain either or both soft and hard keys. Each key 206 can thus be either a soft key or a hard key. Hard keys are buttons having functions that are permanently displayed on the button. Soft keys are programmed by a processor (not shown) in the handset 200. The function of a soft key can change depending on the particular mode in which the handset 200 is operating. The function of the soft key is displayed on the display 208. Soft keys can also be disposed in the touch panel 210.

Initially, the handset 200 communicates with other devices using the frequency pair (transmit and receive frequencies), time slot, code, and/or logical channel of a particular channel selected by the channel selector 214 (perhaps statically stored at the handset 200, or perhaps dynamically assigned by a trunked BS in view of a setting of the channel selector 214). The channel selector 214 is, for example, a knob that has preset isolated choices. When the PTT input 202 is activated initially, the handset 200 transmits at the transmit frequency of the channel frequency pair selected by the channel selector 214. When not being activated, the handset 200 receives at the receive frequency of the channel frequency pair, time slot, code, and/or logical channel selected by the channel selector 214.

While activating the PTT input 202 initiates the PTT function using a preconfigured channel associated with the current channel selector 214 setting, modifying the channel selector 214 while the PTT input 202 is activated invokes a process of maneuvering all or a subset of the PTT devices subscribed to a currently active talkgroup associated with or operating on a first channel to a new channel, in accordance with FIGS. 4-5 below.

Figure 3:
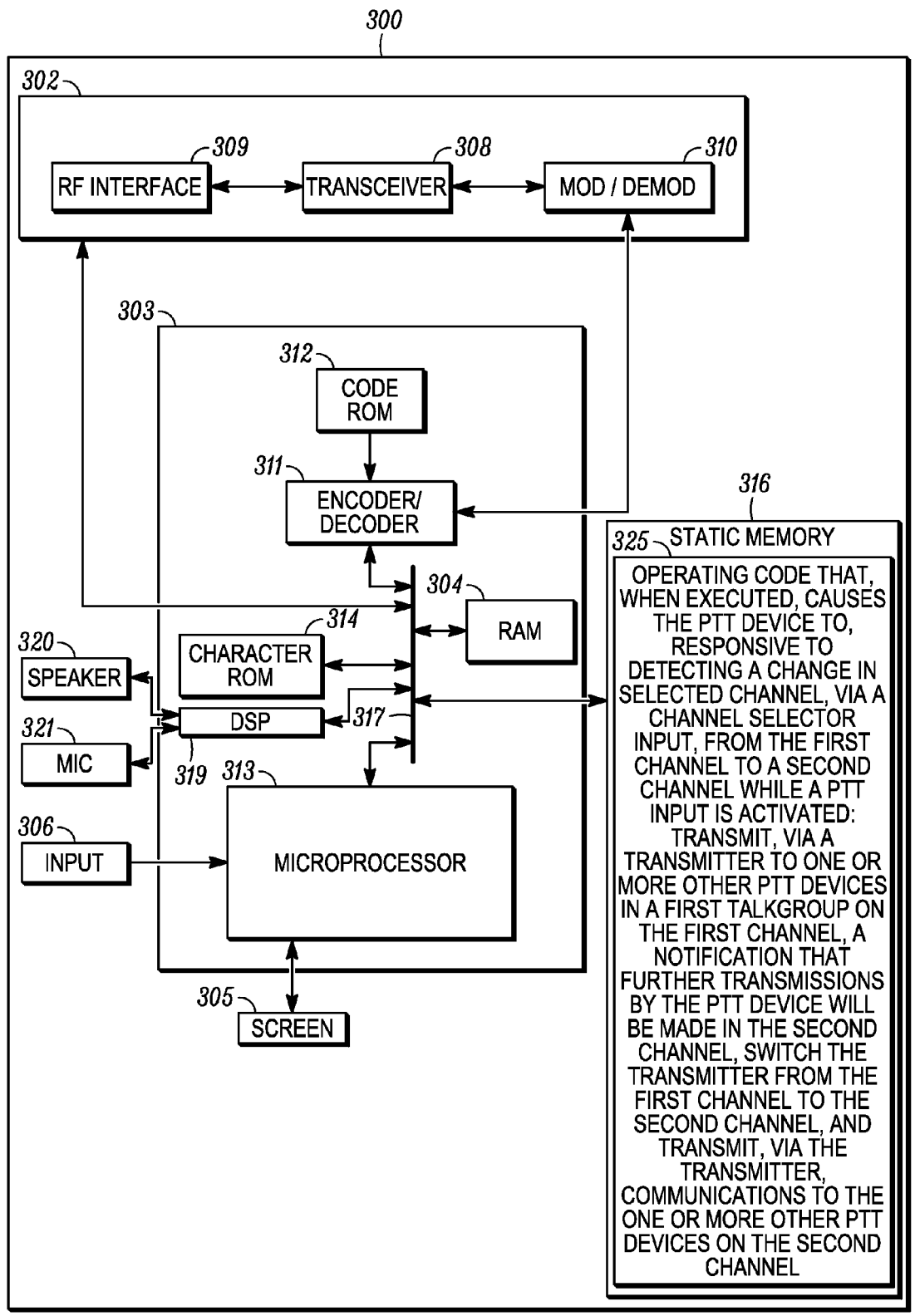
FIG. 3 is a block diagram of an illustrative internal layout of a PTT device in accordance with an embodiment.

FIG. 3 is an example internal functional block diagram of a PTT device 300, such as the PTT device 105 of FIG. 1, that may operate in the system 100. Other PTT devices may contain same or similar structures. As shown in FIG. 3, PTT device 300 includes a communications unit 302 coupled to a common data and address bus 317 of a processing unit 303. The PTT device 300 may also include an input unit (e.g., keypad, pointing device, etc.) 306, an output transducer unit (e.g., speaker) 320, an input transducer unit (e.g., a microphone) 321, and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received between BSs or other PTT devices. The processing unit 303 may further include a microprocessor 313 coupled, by the common data and address bus 317, to the encoder/decoder 311, a character ROM 314, a RAM 304, and a static memory 316. The processing unit 303 may also include a digital signal processor (DSP) 319, coupled to the speaker 320, the microphone 321, and the common data and address bus 317, for operating on audio signals received from one or more of the communications unit 302, the static memory 316, and the microphone 321.

The communications unit 302 may include an RF interface 309 configurable to communicate with BSs and other DCM PTTs within its communication range. The communications unit 302 may include one or more broadband wireless transceivers 308, such as an LTE transceiver, a 3G (3GGP or 3GGP2) transceiver, a WiMAX transceiver perhaps operating in accordance with an IEEE 802.16 standard, and/or other similar type of wireless transceiver configurable to communicate via a wireless network, for infrastructure communications. Additionally or alternatively, communication unit 302 may include one or more second narrowband radio transceivers such as an APCO P25 transceiver, a DMR transceiver, a TETRA transceiver, or one or more second local area network or personal area network transceivers such as Wi-Fi transceiver perhaps operating in accordance with an IEEE 802.11 standard (e.g., 802.11a, 802.11b, 802.11g) or a Bluetooth transceiver, for subscriber device to subscriber device communications. The transceiver 308 is also coupled to a combined modulator/demodulator 310 that is coupled to the encoder/decoder 311. The character ROM 314 stores code for decoding or encoding data such as control, request, or instruction messages, channel change messages, and/or data or voice messages that may be transmitted or received by the PTT device 300.

Static memory 316 may store operating code 325 for the microprocessor 313 that, when executed, causes the PTT device 300 to, responsive to detecting a change in selected channel, via a channel selector input, from the first channel to a second channel while a PTT input is activated: transmit, via a transmitter to one or more other PTT devices in a first talkgroup on the first channel, a notification that further transmissions by the PTT device will be made in the second channel, switch the transmitter from the first channel to the second channel, and transmit, via the transmitter, communications to the one or more other PTT devices on the second channel, in accordance with one or more steps as set forth in FIGS. 4-5 and corresponding text. Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

II. The Process of Maneuvering a Talk Group to a New Channel

Figure 4:
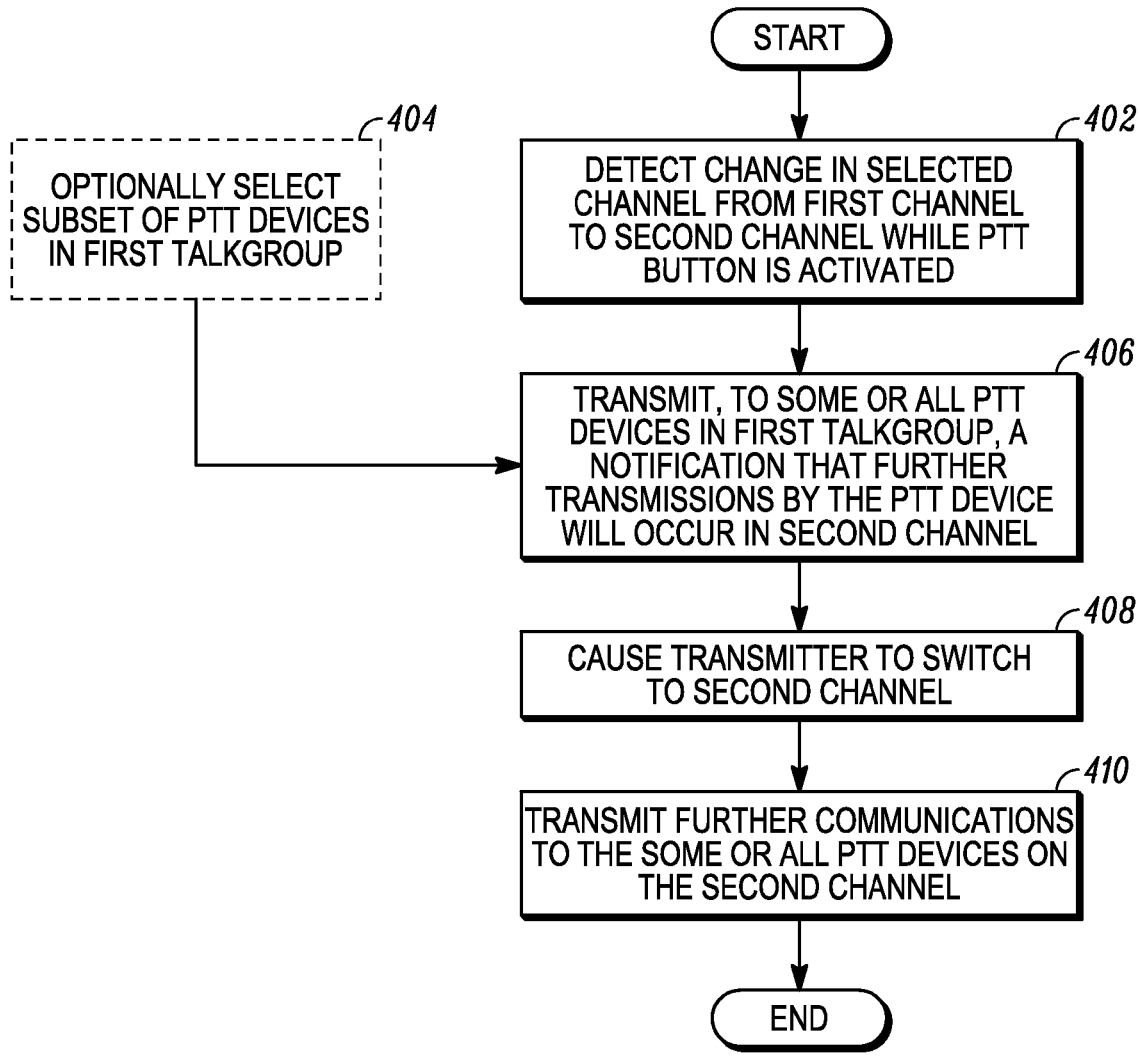
FIG. 4 is a flow diagram illustrating an example process flow executable at a channel change initiating PTT device for maneuvering some or all members of a currently active talkgroup to a new channel, in accordance with an embodiment.
Figure 5:
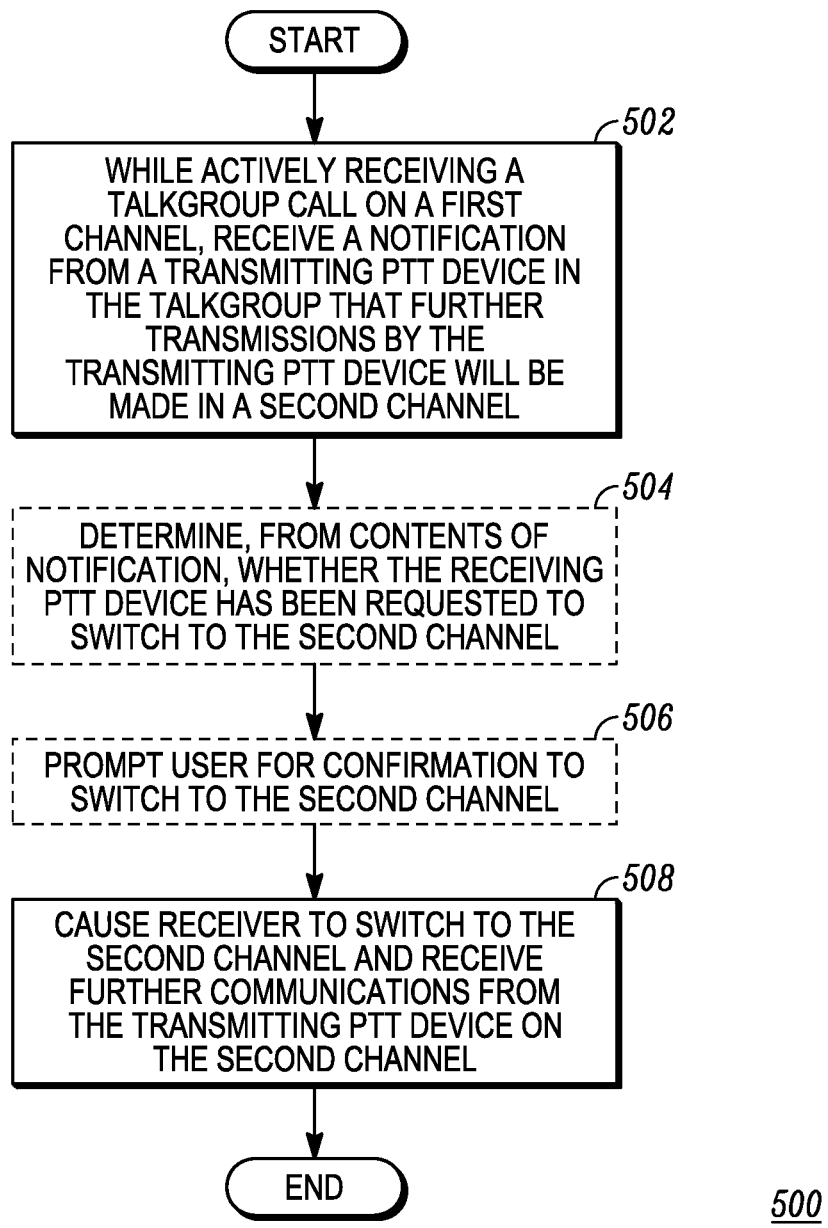
FIG. 5 is a flow diagram illustrating an example process flow executable at a talkgroup receiving device for maneuvering some or all members of a currently active talkgroup to a new channel, in accordance with an embodiment.

FIGS. 4-5 set forth examples of a method for maneuvering some or all PTT devices in a currently active talkgroup to a new channel, from the point of view of an initiating PTT device (FIG. 4) and then from the point of view of a talkgroup receiving PTT device (FIG. 5).

FIG. 4 sets forth an example process flow in which a transmitting PTT device can maneuver a currently active talkgroup (e.g., some or all of the PTT devices in a currently active talkgroup on a first, current channel on which the PTT device is currently keyed) from the first channel to a second channel, in a more automated, time efficient, and error-free manner.

At step 402, a transmitting PTT device that is a member of a first talkgroup and that is currently keyed up on a first channel due to an activation of its PTT input, detects a change in selected channel, from the first channel to a second channel via its channel selection input, while the PTT remains activated. The transmitting PTT device thus becomes a channel change initiating PTT device.

Prior to, during, or after the change in selected channel, the channel change initiating PTT may optionally allow a user to select all of or a subset of PTT devices currently subscribed to the first talkgroup to move to and continue communicating on the second channel. Absent further input, the channel change initiating PTT device may be configured to default to selecting all of the PTT devices currently subscribed to the first talkgroup. However, in some embodiments, a user may wish to narrow down and instruct only a subset of all PTT devices currently subscribed to the first talkgroup to move to the second channel and continue communicating. For example, the first talkgroup may be an umbrella police talkgroup that supports patrolmen, detectives, traffic control, and crowd control subgroups. At a user's request, or during a particular event, it may be desirable for some subgroup to split off of the main subgroup so that the subgroup can carry on more directed or private conversations without interruptions by other subgroups. Accordingly, an input element such as input 306, perhaps in cooperation with a display screen such as screen 305, may allow a user of the channel change initiating PTT device to select some subgroup of PTT devices to move to the second channel. The selection of PTT devices may occur in a number of ways, including a selection of individual radio ID's via the input and display screen (and transferred over the air in the notification message), a selection of a sub-group identifier preconfigured at the radios to identify each of the subgroups (and transferred over the air in the notification message), and a preconfigured profile index that may be stored in a codeplug at the channel change initiating PTT device (and transferred over the air in the notification message), among other possibilities.

At step 406, the channel change initiating PTT device transmits a channel change notification to all of the PTT devices in the first talkgroup instructing all or only some of the PTT devices (identified in the message) in the first talkgroup to switch to the second channel to receive further communications by the channel change initiating PTT device (and/or other PTT devices identified in the message to make the switch to the second channel). The notification message may optionally identify the same, or a different, talkgroup identifier to use on the second channel when communication between the all, or subset, of PTT devices in the first talkgroup make the change from the first channel to the second channel. In the example set forth earlier, for example, a channel change initiating PTT device that is a member of the umbrella police talkgroup and is requesting only traffic control PTT devices that are part of a traffic control subgroup to move to the second channel, may identify a talkgroup identifier associated with a traffic control talkgroup that is different from the police talkgroup identifier, to use when further communicating on the second channel. Step 406 may be executed a number of times, such as 2-3, before moving on to step 408 in order to ensure that all PTT devices intended to receive the notification at step 406 actually receive it.

The notification transmitted at step 406 may be transmitted to different devices, and in different ways, depending on the type of radio network that the channel change initiating PTT device is currently operating in. For example, if the PTT device is operating in a direct mode, the notification may be transmitted directly to all of the PTT devices within wireless transmission range of the channel change initiating PTT device. On the other hand, if the PTT device is operating in a trunked mode in a trunked radio network, the notification may be transmitted (broadcast) indirectly to the one or more other PTT devices via a fixed network repeater device also operating in the trunked mode. In this instance, the channel change initiating PTT device may use the notification to, or may transmit a separate request to the trunked repeater prior to the notification, to request the second channel be allocated as a traffic channel, via one of the first channel and a control channel associated with the fixed network repeater device. The fixed network repeater device may then transmit a corresponding new call notification in one or more of the first channel, the second channel, and the control channel. The new call notification may be used to indicate to the one or more other PTT devices where to find the second channel, or the channel change initiating PTT device may send a second notification to the one or more other PTT devices, on the first channel and via the repeater, indicating the second (traffic) channel, granted by the trunked repeater, to move to.

Alternatively, if the PTT device is operating in a conventional mode in a conventional radio network, the notification may be transmitted indirectly to the one or more other PTT devices via a fixed network repeater device operating in the conventional mode. In this case, the channel change initiating PTT device may identify and determine the availability of the second channel prior to transmitting the notification (perhaps via a carrier sense mechanism), or may rely on the conventional repeater to determine an available second conventional channel and either announce the available second conventional channel in a call grant message on one or more of the first and second channel, or provide the information back to the channel change initiating PTT device so that it may transmit a second channel change notification message with the second channel indicated by the conventional repeater in the message. Other possibilities exist as well.

Finally, if the PTT device is operating in a broadband network implementing a broadband protocol such as OMA-PoC standard, or the PoIP standard, the channel change notification may set forth a second logical channel identifier to use in future communications between the members of the talkgroup (or sub-talkgroup).

In any one of the networks or modes noted above, the notification may be transmitted in one of an embedded or dedicated signaling space on the first channel, or may be transmitted in a voice traffic portion of the first channel via user-plane stealing. For example, an embedded link control message (embedded LC) may be used to transmit the notification, a link control (LC) message may be used to transmit the notification, or all or a portion of a voice frame may be replaced with the notification.

At step 408, the channel change initiating PTT device switches from the first channel to the second channel. In an FDMA radio network, this may include switching from a first frequency to a second separate frequency different from the first. In a TDMA radio network, this may alternately include switching from a first time slot to a second time slot, perhaps in addition to switching from a first frequency to a second separate frequency. In a CDMA radio network, this may alternately include switching from using a first spreading code to a second spreading code different from the first, perhaps in addition to switching from a first frequency to a second separate frequency. In a broadband network implementing a broadband protocol such as OMA-PoC standard, or the PoIP standard, switching channels may include using a same broadband connection but switching from using a first logical channel identifier in transmitted communications to identify communications associated with the first logical channel or first talkgroup to using a second logical channel identifier in transmitted communications to identify communications associated with the second channel or second talkgroup.

At step 410, the channel change initiating PTT device continues communicating with (including transmitting and/or receiving) the one or more PTT devices from the first talkgroup that maneuvered to the second channel, using a same or different talkgroup identifier.

FIG. 5 sets forth an example process flow in which a talkgroup receiving PTT device can follow a currently active talkgroup from the first channel to a second channel, in a more automated, time efficient, and error-free manner.

At step 502, a talkgroup receiving PTT device is actively receiving a group talkgroup call on a first channel (e.g., a transmitting PTT device in the talkgroup is keyed up on the first channel, whether or not voice or data is actually being transmitted by the transmitting PTT device at any particular point in time). During the call, the talkgroup receiving PTT device receives a notification from the transmitting PTT device (directly, or via a repeater) in the talkgroup that further transmissions by the transmitting PTT device (e.g., now also identified as the channel change initiating PTT device) will be made in a second channel.

At optional step 504, the talkgroup receiving PTT device may determine, from the contents of the notification, whether the talkgroup receiving PTT device has been requested to switch to the second channel by the channel change initiating PTT device. As set forth earlier, the notification may include radio ID's, separate talkgroup or sub-group IDs, or codeplug profiles, among other possibilities, to identify talkgroup receiving PTT devices that should move to the second channel. Accordingly, the talkgroup receiving PTT device may be configured to compare the radio ID in the notification to its radio ID, the talkgroup or sub-talkgroup indicated in the notification to talkgroup or sub-talkgroup IDs preconfigured or populated at the receiving PTT device, and/or the codeplug profile indicated in the notification with a codeplug profile stored at the talkgroup receiving PTT device, among other options. If the talkgroup receiving PTT device finds a match, it may assume that it should make the change to the second channel, and absent negative user input in the following step 506, may switch to the second channel automatically at step 508. If no radio ID's, talkgroup or sub-talkgroup IDs, or codeplug profiles are included in the notification, the talkgroup receiving PTT device may assume that all members of the first talkgroup are being instructed to move to the second channel, and may take corresponding action at step 508, perhaps dependent, again, on step 506.

At optional step 506, the talkgroup receiving PTT device may prompt a user, in response to receiving the notification, with an indication that the notification has been received and that the talkgroup receiving PTT device has been requested to move to the second channel for further communications (including, perhaps, displaying the radio ID, talkgroup or sub-talkgroup ID, or codeplug profile indicated in the notification, if present). If the user determines that he or she does not wish to switch to the second channel, the user can prevent the talkgroup receiving PTT device from automatically switching by instructing the talkgroup receiving PTT device, perhaps via an input such as input 306 of FIG. 3, not to switch to the new channel. Responsive to such an instruction, the receiving PTT device may halt process 500 and refrain from proceeding to step 508. In some embodiments, the information relevant for following the channel change initiating PTT device to the second channel may be caused to be stored at the talkgroup receiving PTT device and/or otherwise continuously displayed on a display of the talkgroup receiving PTT device, so that even if the user declines to immediately follow the channel change initiating PTT device to the second channel, perhaps due to a desire to finish a conversation or other transmission on the first channel, the user may subsequently manually operate the talkgroup receiving PTT device to move to the second channel using the previously stored or displayed information and rejoin the conversation with the channel change initiating PTT device on the second channel.

Assuming that no input is received, or an acknowledgment is received indicating that the user desires to move to the second channel, processing would automatically proceed to step 508.

At step 508, the talkgroup receiving PTT device causes its receiver to switch to the second channel (physical or logical) and receive further communications from the channel change initiating PTT device (and/or other PTT devices in the first talkgroup that also made the switch to the second channel) on the second channel.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A push-to-talk (PTT) device comprising:
   a wireless transmitter;
   a wireless receiver;
   a channel selector input that selects a channel on which to transmit communications, via the wireless transmitter;
   a PTT transmit input; and
   a processor configured to:
      detect activation of the PTT transmit input that activates transmission, via the wireless transmitter, of a PTT signal and subsequent audio or data from the PTT device to a particular talkgroup as a function of the channel selector input; and
      responsive to detecting, while the PTT transmit input is activated, a change in selected channel via the channel selector input, from a first channel to a second channel different from the first channel:
         transmit, to one or more other PTT devices in a first talkgroup on the first channel via the wireless transmitter, a notification that further transmissions by the PTT device will be made in the second channel;
         switch the wireless transmitter from the first channel to the second channel; and
         transmit communications, via the wireless transmitter, to the one or more other PTT devices in a second talkgroup on the second channel.

2. The PTT device of claim 1, further comprising a display, a microphone, and a speaker.

3. The PTT device of claim 1, wherein the channel selector input is a rotatable channel selector knob.

4. The PTT device of claim 1, wherein the processor is further configured to transmit, on the first channel via the wireless transmitter, a plurality of notifications that further transmissions by the PTT device will be made in the second channel prior to switching the transmitter from the first channel to the second channel.

5. The PTT device of claim 1, wherein the PTT device operates in a direct mode, and transmits the notification directly to the one or more other PTT devices.

6. The PTT device of claim 1, wherein the PTT device operates in a trunked mode, and transmits the notification indirectly to the one or more other PTT devices via a fixed network repeater device operating in a trunked mode.

7. The PTT device of claim 6, wherein the processor is further configured to request the second channel via a request sent to the fixed network repeater device, via the wireless transmitter on one of the first channel and a control channel associated with the fixed network repeater device, the fixed network repeater device transmitting a corresponding new call notification in one or both of the second channel and the control channel.

8. The PTT device of claim 1, wherein the PTT device operates in a conventional mode, and transmits the notification indirectly to the one or more other PTT devices via a fixed network repeater device operating in a conventional mode.

9. The PTT device of claim 1, wherein the PTT device operates in a broadband mode and the first and second channels are logical channels transmitted over a same physical link.

10. The PTT device of claim 1, wherein the notification is transmitted to each one of the one or more other PTT devices in the first talkgroup.

11. The PTT device of claim 1, wherein the notification is transmitted to a subset of each one of the one or more other PTT devices in the first talkgroup, the subset determined via one of: a manual selection of radio IDs at the PTT device, a manual selection of a subordinate talkgroup at the PTT device, and a manual selection of a profile from a codeplug at the PTT device.

12. The PTT device of claim 1, wherein the notification is transmitted in one of an embedded or dedicated signaling space on the first channel.

13. The PTT device of claim 1, wherein the notification is transmitted in a voice traffic portion of the first channel via user-plane stealing.

14. A method of communicating with a plurality of push-to-talk (PTT) devices in a wireless network of PTT devices, the method comprising, at a first one of the PTT devices:
   detecting activation of a PTT transmit input that activates wireless transmission, via a transmitter, of a PTT signal and subsequent audio or data from the PTT device to a particular talkgroup as a function of a channel selector input;
   responsive to detecting, while the PTT transmit input is activated, a change in selected channel via the channel selector input, from a first channel to a second channel different from the first channel:
      wirelessly transmitting, via the transmitter, to one or more other PTT devices in a first talkgroup on the first channel, a notification that further transmissions by the PTT device will be made in the second channel;
      switching the transmitter, via the transmitter, from the first channel to the second channel; and
      wirelessly transmitting further communications to the one or more other PTT devices in a second talkgroup on the second channel.

15. The method of claim 14, further comprising transmitting, on the first channel, a plurality of notifications that further transmissions by the PTT device will be made in the second channel prior to switching the transmitter from the first channel to the second channel.

16. The method of claim 14, wherein the PTT device operates in a direct mode, and transmits the notification directly to the one or more other PTT devices.

17. The method of claim 14, wherein the PTT device operates in a trunked mode, and transmits the notification indirectly to the one or more other PTT devices via a fixed network repeater device operating in a trunked mode.

18. The method of claim 17, further comprising the PTT device requesting the second channel via a request sent to the fixed network repeater device, via one of the first channel and a control channel associated with the fixed network repeater device, the fixed network repeater device transmitting a corresponding new call notification in one or both of the second channel and the control channel.

19. The method of claim 14, wherein the notification is transmitted to a subset of each one of the one or more other PTT devices in the first talkgroup, the subset determined via one of: a manual selection of radio IDs at the PTT device, a manual selection of a subordinate talkgroup at the PTT device, and a manual selection of a profile from a codeplug at the PTT device.

20. The method of claim 14, wherein the notification is transmitted in a voice traffic portion of the first channel via user-plane stealing.

* * * * *

UNITED STATES PATENT AND TRADEMARK OFFICE
CERTIFICATE OF CORRECTION

PATENT NO. : 8,982,763 B2
APPLICATION NO. : 13/770211
DATED : March 17, 2015
INVENTOR(S) : Gabi Ofir et al.

Page 1 of 1

It is certified that error appears in the above-identified patent and that said Letters Patent is hereby corrected as shown below:

IN THE TITLE PAGE:

In Item (71), under "Applicant," in Column 1, Lines 1-2, delete "Schaumburg (IL)" and insert -- Schaumburg, IL (US) --, therefor.

In Item (72), under "Inventors," in Column 1, Line 1, delete "Reshon Letzion" and insert -- Rishon Lezion --, therefor.

In Item (72), under "Inventors," in Column 1, Line 2, delete "Makabim-Re'Ut" and insert -- Maccabim-Re'ut --, therefor.

IN THE SPECIFICATION:

In Column 7, Lines 40-41, delete "(3GGP or 3GGP2)" and insert -- (3GPP or 3GPP2) --, therefor.

Signed and Sealed this
Twenty-sixth Day of July, 2016

Michelle K. Lee
*Director of the United States Patent and Trademark Office*